United States Patent
Muranaka et al.

(10) Patent No.: US 7,656,314 B2
(45) Date of Patent: Feb. 2, 2010

(54) INPUT DEVICE

(75) Inventors: Tetsuo Muranaka, Fukushima-ken (JP); Akihiro Shinohe, Fukushima-ken (JP); Shuzo Ono, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 659 days.

(21) Appl. No.: 11/511,942

(22) Filed: Aug. 28, 2006

(65) Prior Publication Data
US 2007/0052688 A1    Mar. 8, 2007

(30) Foreign Application Priority Data
Sep. 2, 2005    (JP) .............................. 2005-254367

(51) Int. Cl.
    *H03M 11/00* (2006.01)
(52) U.S. Cl. ..................... 341/22; 341/31; 345/173; 178/18.03; 708/146
(58) Field of Classification Search .............. 341/22, 341/31; 345/156, 173; 178/18.03; 455/90; 708/146
See application file for complete search history.

(56) References Cited

U.S. PATENT DOCUMENTS

| | | | |
|---|---|---|---|
| 3,996,557 A | * | 12/1976 | Donahey .................... 382/186 |
| 7,352,295 B2 | * | 4/2008 | Sohng ......................... 341/22 |
| 2002/0145592 A1 | * | 10/2002 | Schauer ...................... 345/156 |
| 2003/0064686 A1 | * | 4/2003 | Thomason et al. ........... 455/90 |
| 2006/0227100 A1 | * | 10/2006 | Kun et al. ................... 345/156 |

FOREIGN PATENT DOCUMENTS

| JP | 2004-213269 | 7/2004 |
|---|---|---|
| JP | 2005-031786 | 2/2005 |

* cited by examiner

*Primary Examiner*—Timothy Edwards, Jr.
(74) *Attorney, Agent, or Firm*—Brinks Hofer Gilson & Lione

(57) ABSTRACT

An input device is provided. The input device includes an operation unit. A coordinate input unit capable of detecting that an operating body is in contact with the operation unit and detecting a position coordinate on the operation unit of a position where the operating body contacted the operation unit. A data processing unit outputs an operation processing signal on the basis of a detection signal received from the coordinate input unit. The data processing unit outputs an operation confirmation processing signal for the input operation after an input operation is performed while the operating body is contacting the operation unit, when tapping is performed on the operation unit, with the operating body kept in contact with the operation unit.

8 Claims, 6 Drawing Sheets

FIG. 1
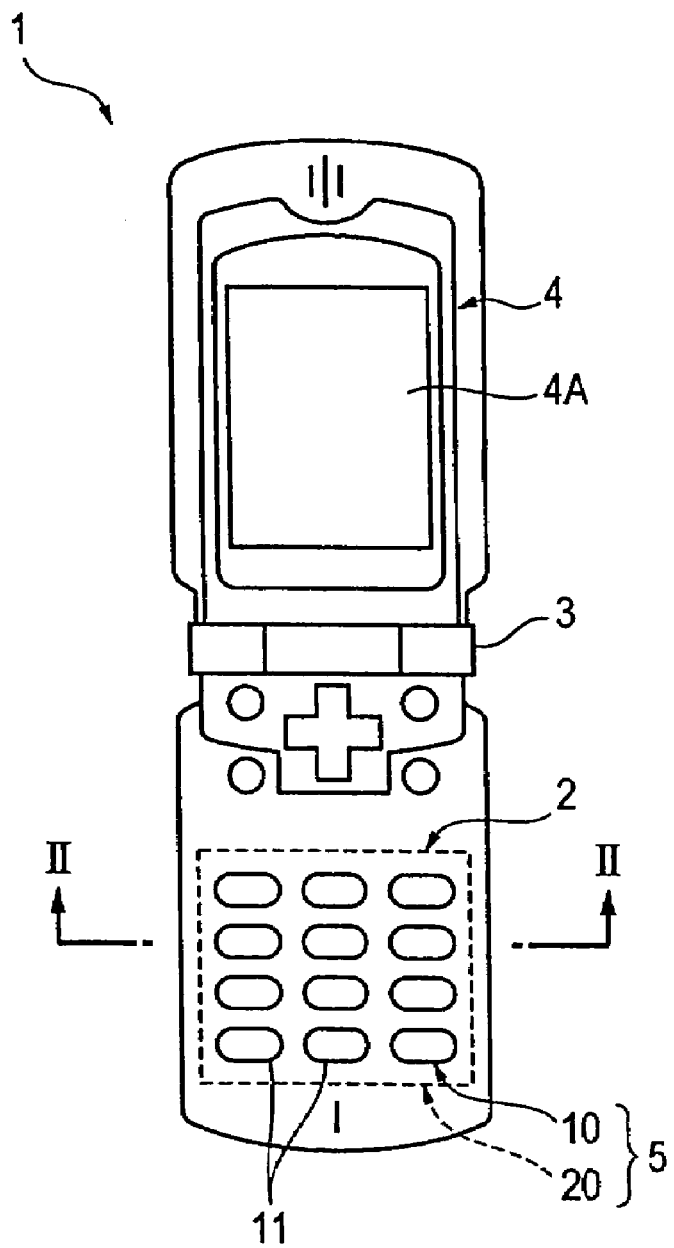
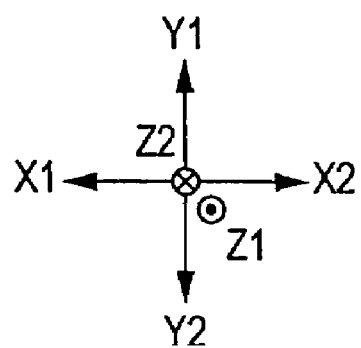

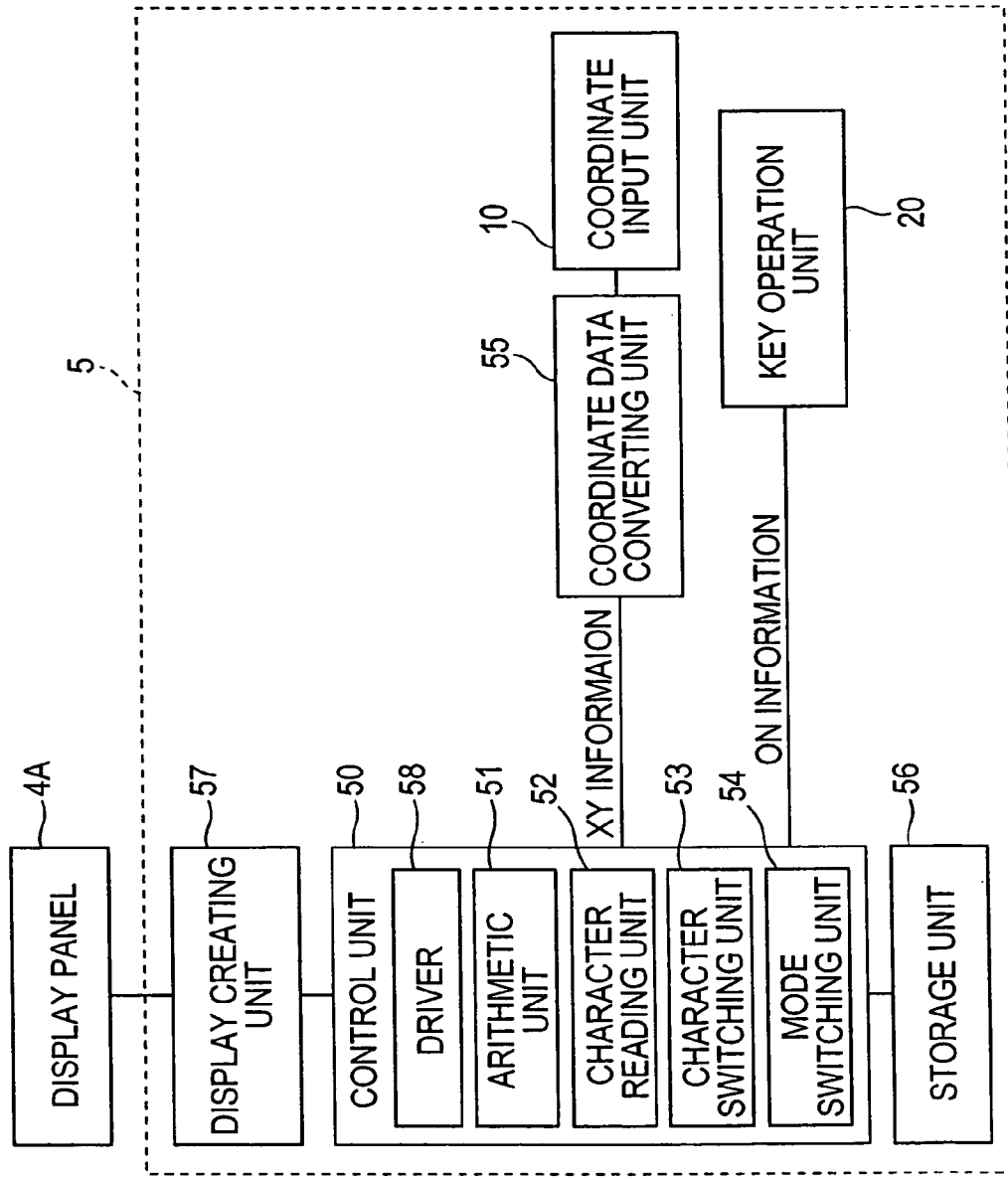

INPUT DEVICE

This application claims the benefit of Japanese Patent Application No. 2005-254367 filed on Sep. 2, 2005, which is hereby incorporated by reference.

BACKGROUND

1. Field

The present embodiments relate to an input device for inputting a character for use in an electronic device.

2. Related Art

Input devices have been previously mounted on electronic apparatuses such as an information terminal or a personal computer. The input device has a configuration that enables an input operation to be input using a hand-written character by recognizing a coordinate position as an XY plane coordinate of the character input by, for instance, hand writing.

With this coordinate input device, when an operating body such as a finger of a user contacts or presses an arbitrary position in an input area formed at the input device to write a character or other suitable symbol, the contacted or pressed position of the input device is detected as a coordinate value. The coordinate value is input to an electronic apparatus body, as a coordinate data signal.

A character or handwriting can be displayed on a display unit provided at a device body based on the input coordinate data signal.

Such input devices, which enable inputting of the handwritten characters, are disclosed in Japanese Unexamined Patent Application Publication Nos. 2004-213269 and 2005-31786 as follows.

In order to confirm that the character inputting is completed, the input device disclosed in Japanese Unexamined Patent Application Publication No. 2004-213269 is configured to recognize that a new character is not input for a predetermined period of time after the character inputting, and to confirm the character inputting when the predetermined period of time has elapsed.

Accordingly, it is necessary to wait for the predetermined period of time to pass to confirm the completion of the character inputting, thereby disabling the quick input operation.

The input device disclosed in Japanese Unexamined Patent Application Publication No. 2005-31786 is configured, after the character inputting, to confirm the character inputting by taking a hand-off the input area where the character has been input and then pressing another button provided at a position away from the input area.

Accordingly, similarly to the input device disclosed in Japanese Unexamined Patent Application Publication No. 2004-213269, when a confirmation button formed at the position away form the input area is pressed for confirming the character inputting, a contacting body is necessary to be moved to the position away from the input area for confirming the completion of the character inputting. Accordingly, the completion of the character inputting cannot be easily confirmed. Thus, there is a need for an input device that enables simple and quick character inputting.

SUMMARY

In one exemplary embodiment, an input device includes an operation unit. A coordinate input unit is provided. The coordinate input unit is capable of detecting whether an operating body is in contact with the operation unit and detecting a position coordinate on the operation unit of a position where the operating body contacted the operation unit. A data processing unit outputs an operation processing signal on the basis of a detection signal received from the coordinate input unit. After an input operation is performed while the operating body is in contacting the operation unit, when tapping is performed on the operation unit, with the operating body kept in contact with the operation unit, the data processing unit outputs an operation confirmation processing signal for the input operation.

The operation confirmation processing signal may be output when the tapping is performed by another operating body that is different from the operating body for performing the input operation.

The operation confirmation processing signal may be an operation processing signal similar to that outputted when double tapping is performed on the operation unit.

The coordinate input unit may include a plurality of X-direction electrodes provided on one surface of a base material sheet. A plurality of Y-direction electrodes are provided on the other surface. A plurality of common electrodes are provided on either the one surface or the other surface for providing predetermined capacitances between the common electrodes and the X-direction electrodes, and between the common electrodes and the Y-direction electrodes.

The operating body may a dielectric, and in this device, the operating body may be a finger.

According to the present embodiments, after the input operation is performed and while the operating body is contacting the operation unit, tapping is performed on the operation unit, with the operating body kept in contact with the operation unit. At the time of tapping, the data processing unit outputs the operation confirmation processing signal for the input operation, so that the input operation is confirmed.

Therefore, with the input device, merely the tapping can effect the input confirmation without releasing the operating body, which performed the input operation from the operation unit, thereby simplifying the operation.

In the operation for the input confirmation, according to the present embodiments, it is not necessary to wait for the predetermined period of time to pass. This is in contrast to the conventional input device in which the input confirmation is performed if any input operation is not performed for the predetermined period of time after the input operation is completed. Thus, the time required for the input operation is reduced.

BRIEF DESCRIPTION OF THE DRAWINGS

FIG. 1 is a front elevational view showing a mobile phone, which is an example of an electronic apparatus, provided with an input device;

FIG. 4 is an explanatory view showing an operation for inputting a character by using the input device shown in FIG. 1;

DESCRIPTION OF THE PREFERRED EMBODIMENTS

Figure 2:
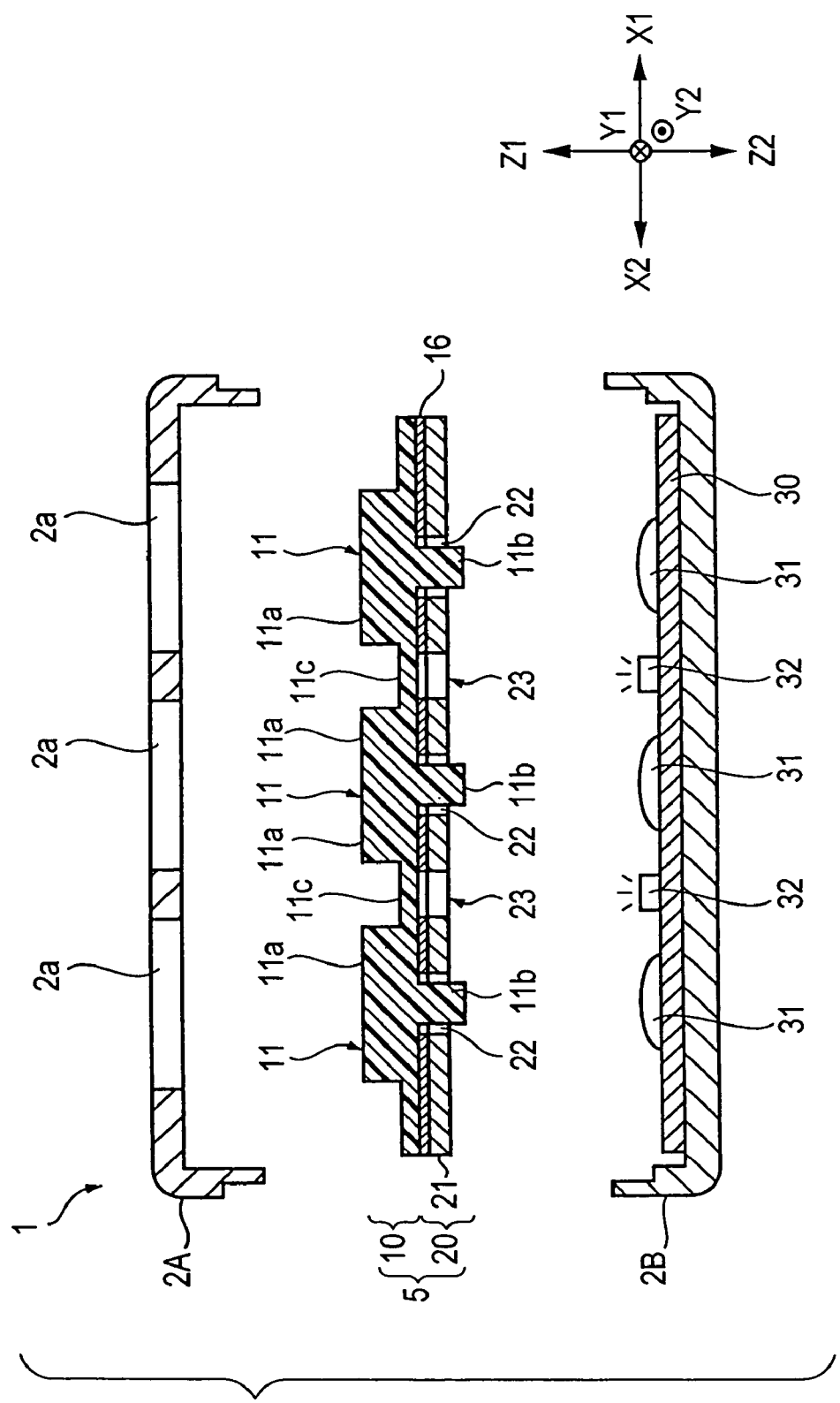
FIG. 2 is an exploded cross-sectional view showing the mobile phone shown in FIG. 1 taken along line II-II.

FIG. 1 is a plan view showing a mobile phone 1, on which an input device is mounted. The mobile phone 1 shown in FIG. 1 is a flip phone type. The mobile phone 1 includes an operation unit 2. A hinge 3 and a display unit 4 are provided in the Y1 direction in the drawing of the operation unit 2. A display panel 4A is provided on the display unit 4. The display panel 4A includes a black-and-white or color liquid crystal panel or an EL panel. The operation unit 2 and the display unit 4 can be in an open state, as shown in FIG. 1, and in a closed state (not shown), while the hinge 3 serves as a rotation center.

As shown in FIGS. 1 and 2, an input device 5 is provided at the operation unit 2. The input device 5 includes a key operation unit 10, which has operation keys 11 and later-described switches 31, and a coordinate input unit 20. The key operation unit 10 has a plurality of operation keys 11 aligned on the operation unit 2. The switches 31 are formed below the operation keys 11.

As shown in FIG. 2, an upper case 2A and a lower case 2B are fitted and combined to form the operation unit 2. A plurality of openings 2a are formed in the upper case 2A.

The operation keys 11 are made of transparent or semi-transparent resin materials. Characters, symbols, figures, or the like are printed on the surfaces of key tops 11a which are the surfaces of the operation keys 11. The plurality of operation keys 11 are integrally connected to each other with hoops 11c interposed at the connected parts to form the key operation unit 10. Therefore, the operation keys 11 are connected to each other with the hoops 11c interposed at the connected parts in an elastically deformable manner in the Z1-Z2 direction in the drawing. In addition, cylindrical stems (pressing projections) 11b integrally project from the back surfaces (surfaces in the Z2 direction shown in FIG. 2) of the operation keys 11, and extend toward the lower case 2B (in the Z2 direction shown in FIG. 2).

As shown in FIG. 2, a circuit board 30 is fixed at the lower case 2B. The plurality of switches 31, which constitute a part of the key operation unit 10; and a light source 32, a control unit (not shown) and other electronic components, are formed on the circuit board 30.

The switches 31 shown in FIG. 2 have, for example, dome-shaped metal reverse plates (not shown), which are diaphragms with contact electrodes (not shown) provided therein. The base end portion of each reverse plate is fixed at a ring-shaped electrode provided on the circuit board 30, the inner surface of the reverse plate facing the contact electrode provided at the inner center potion of the reverse plate. This embodiment provides a switch structure configured. When a pressing force is applied to the reverse plate in the Z2 direction in the drawing, the reverse plate is reversed and then the inner surface of the reverse plate contacts the contact electrode to allow the contact electrode to be conducted to the ring-shaped electrode. Each switch 31 is disposed on the circuit board 30 to face the end surface of each corresponding stem 11b of the operation key 11. The light source 32 includes a LED or the like, which is provided between the adjacent switches 31.

As shown in FIG. 2, the coordinate input unit 20 is provided in the operation unit 2. The coordinate input unit 20 includes a film-like base material sheet 21 that has insulation performance and transparency. A plurality of X-direction electrodes (not shown) are provided on one surface of the base material sheet 21. The X-direction electrodes extend in the vertical direction (Y1-Y2 direction in the drawing) and are disposed at a predetermined interval in the horizontal direction (X1-X2 direction in the drawing). The wiring is configured so that the X-direction electrodes do not contact the plurality of common electrodes (not shown) which are provided among the X-direction electrodes, and also extend in the vertical direction (Y1-Y2 direction in the drawing), and are disposed at a predetermined interval in the horizontal direction (X1-X2 direction in the drawing). The common electrodes are connected to one at the end in the Y2 direction in the drawing, and the connected part is drawn to the outside of the base material sheet 21.

A plurality of Y-direction electrodes (not shown) are provided on the other surface of the base material sheet 21. The Y-direction electrodes extend in the horizontal direction (X1-X2 direction in the drawing) and are disposed at a predetermined interval in the vertical direction (Y1-Y2 direction in the drawing).

The plurality of X-direction electrodes provided on the one surface of the base material sheet 21 and the plurality of Y-direction electrodes provided on the other surface are arranged to be orthogonal to each other on both surfaces of the base material sheet 21, for example, they are arranged substantially in a matrix. The X-direction electrodes and the Y-direction electrodes form an XY plane coordinate.

A top sheet (not shown) that covers the X-direction electrodes and the common electrodes is laminated on the one surface of the coordinate input unit 20, while a back sheet (not shown) that covers the Y-direction electrodes is laminated on the other surface. The top and back sheets can be dielectric transparent sheets.

As shown in FIG. 2, first through holes 22 allow the stems 11b to pass through. Second through holes 23 serve as passages that allow light emitted from the light sources 32 to be led to the operation keys 11 provided on the upper case 2A side, are formed in the base material sheet 21 (as well as in the top and back sheets).

As shown in FIG. 2, the key operation unit 10 and the coordinate input unit 20 are laminated and provided between the upper case 2A and the lower case 2B. The coordinate input unit 20 is fixed on the lower surface of the key operation unit 10 with an adhesive 16 interposed therebetween.

Figure 3:
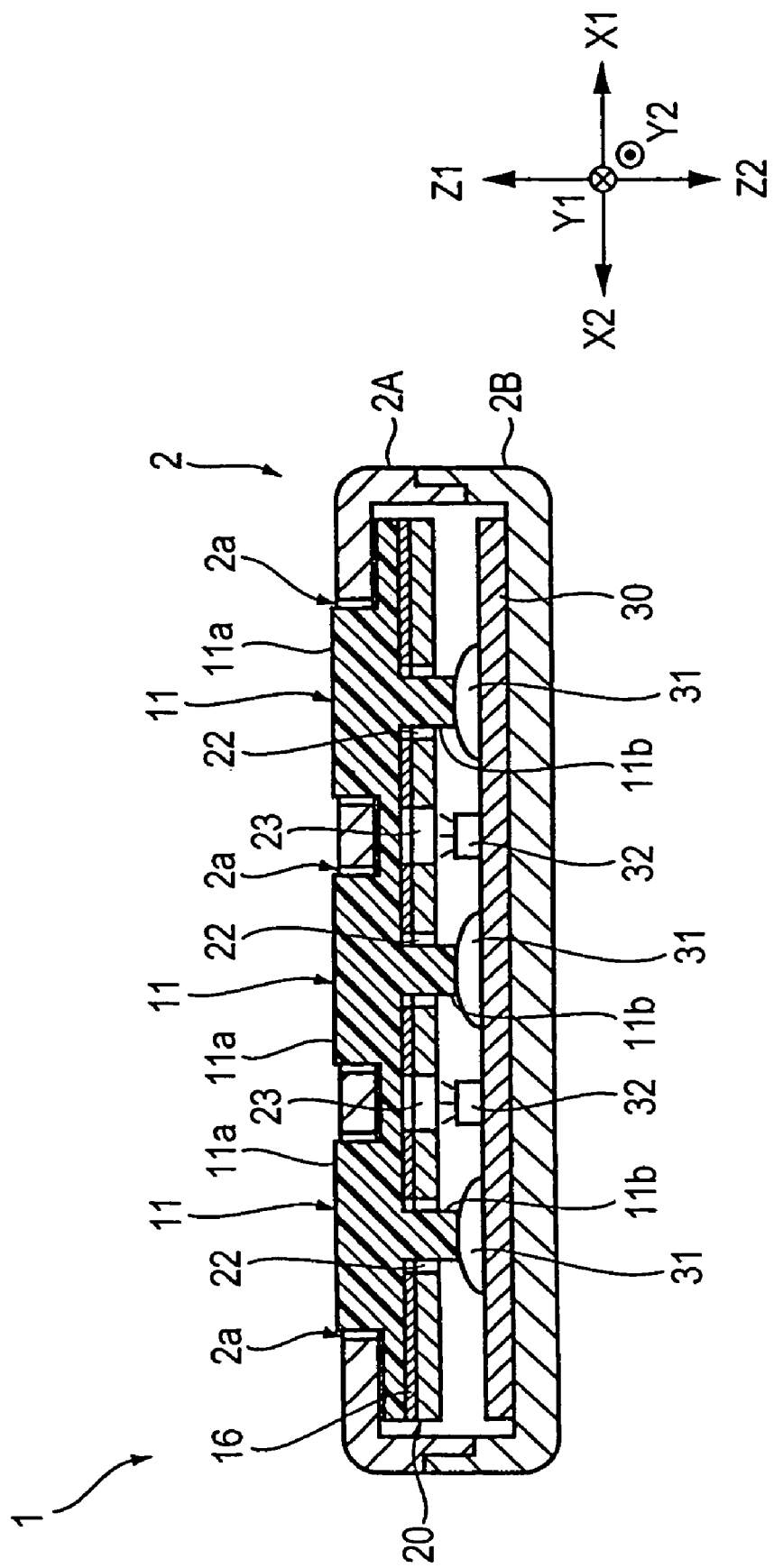
FIG. 3 is a cross-sectional view showing the mobile phone shown in FIG. 1 taken along line II-II.

As shown in FIG. 3, when the upper case 2A and the lower case 2B are coupled to each other while the key operation unit 10 and the coordinate input unit 20 are disposed between the cases, the operation keys 11 of the key operation unit 10 are inserted to the plurality of openings 2a formed in the upper case 2A, so that only the key tops 11a are exposed to the outside of the operation unit 2 through the openings 2a. Accordingly, when a pressing body, for example, a finger, is touched to the key top 11a to press it in the Z2 direction, the operation key 11 can be pressed down in the Z2 direction in the drawing.

The switches 31 fixed on the circuit board 30 are disposed with a end surface on the lower side (Z2 direction in the drawing) of the stems 11b of the operation keys 11. Accordingly, when the operation key 11 is pressed down, the stem 11b is moved inside the first through hole 22 and presses the reverse plate provided at the switch 31, so that the reverse plate is reversed and thus the switch 31 can be switched to the ON state. A character printed on the key top 11a of the operation key 11 can be input, and the character is displayed on the display panel 4A by the control unit (not shown). The reversing of the reverse plate provides a crisp tactile feel to an operator at this time.

The light source 32 faces the second through hole 23 formed in the base material sheet 21. The light emitted from the light source 32 passes through the second through hole 23 as a passage formed in the base material sheet 21, so that the back surface of the operation key (operation member) 11 can be brightly illuminated. Since the operation key 11 is made of transparent or semitransparent resin material, the light emitted from the light source 32 can be visually recognized from the key top 11a of the operation key 11. Accordingly, the character, letter, symbol, figure, or the like printed on the key top 11a can be clearly recognized even in darkness.

In the coordinate input unit 20, a predetermined voltage is applied between the X-direction electrodes and the common electrodes, and then between the Y-direction electrodes and the common electrodes, sequentially with a predetermined sampling cycle, so that change in a capacitance between the X-direction electrodes and the common electrodes, and that between the Y-direction electrodes and the common electrodes are output as voltage values.

When an operating body 17 that is a dielectric such as the finger of the user contacts an arbitrary position on the operation unit 2 on the XY plane coordinate, the capacitances are changed, so that the voltage values output from the X-direction electrodes and the Y-direction electrodes are changed sequentially from the position close to the arbitrary position, thereby detecting the contact of the operating body 17.

The control unit (not shown) provided at the circuit board 30 can detect a position coordinate of the operating body 17 that contacts the operation unit 2 as a position on the XY plane coordinate, by using the voltage values corresponding to the change in the capacitance between the X-direction electrodes and the common electrodes; and that between the Y-direction electrodes and the common electrodes.

When the user moves the operating body 17 on the operation unit 2 to hand write the character or the like, the control unit detects a movement locus of the operating body 17 according to temporal change in the voltage values, so that the character written by the operating body 17 can be input.

As shown in FIG. 4, the input device 5 includes the key operation unit 20, the coordinate input unit 10, a control unit 50, a storage unit 56 and a display creating unit 57.

The key operation unit 20 and the coordinate input unit 10 are connected to the control unit 50. A coordinate signal from the coordinate input unit 10 is converted into coordinate data by a coordinate data converting unit 55, and position coordinate data (XY information) of the operating body 17 is loaded to the control unit 50. In addition, a switch signal (ON information) from the switch 31 of the key operation unit 10 is also loaded to the control unit 50.

In addition, the control unit 50 is provided with an arithmetic unit 51, a character reading unit 52, a character switching unit 53, a mode switching unit 54, and a driver 58 which constitutes a data processing unit.

The arithmetic unit 51 calculates the position where the operating body 17 such as the finger is in contact with the operation unit 2 (coordinate data) by using the coordinate data received from the coordinate data converting unit 55, or calculates a movement amount of the operating body 17 by using the coordinate data.

The character reading unit 52 acquires the character to be displayed from the storage unit 56 by using arithmetic information of the arithmetic unit 51, and sends character information to the display creating unit 57.

The character switching unit 53 receives an instruction from the mode switching unit 54, and sends what type of characters is selected, such as Hiragana (Japanese syllabary), Katakana (Japanese syllabary mainly for representing foreign words), numeric characters, alphabets, or other suitables symbols to the character reading unit 52.

The mode switching unit 54 is a controller that switches to various modes such as a phone mode, an e-mail mode and an web mode, or switches to character types (Hiragana, numeric characters, and other suitable symbols) desired to be input, for instance, in the e-mail mode.

The display creating unit 57 receives a signal from the character reading unit 52, the mode switching unit 54, or the like, and generates a display processing signal for a window to be displayed on the display panel 4A. The display processing signal is sent to the display panel 4A, so that the character is displayed on the display panel 4A.

The driver 58 outputs a predetermined operation processing signal on the basis of the signals from the coordinate input unit 20 and the key operation unit 10.

In the embodiment shown in FIG. 4, while the input device 5 is configured to include the key operation unit 10, the coordinate input unit 20, the control unit 50, the storage unit 56, the display creating unit 57 and the driver 58, the input device 5 is not limited to this configuration. For example, the input device 5 may be configured to include the coordinate input unit 20, the key operation unit 10, the coordinate data converting unit 55 and the driver 58, or may even omit the key operation unit 10 from that configuration.

Figure 5A:
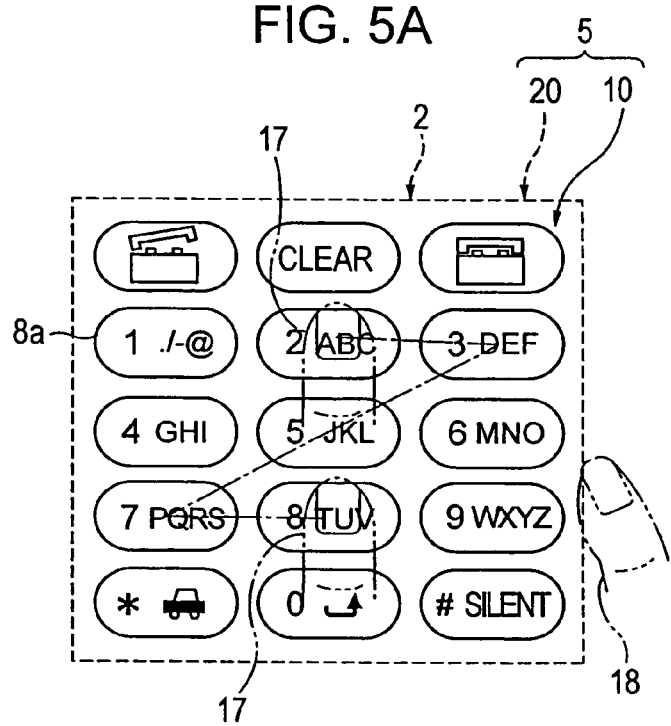
FIG. 5A is an explanatory view showing an operation that inputs a character by using the input device shown in FIG. 1.
Figure 5B:
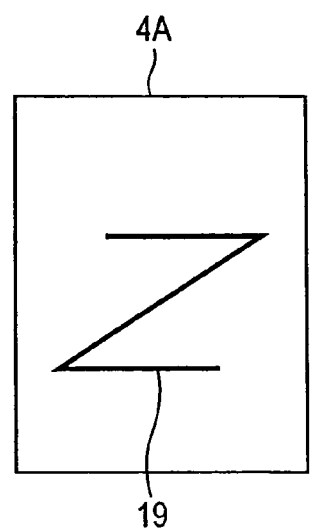
FIG. 5B is an illustration showing an exemplary window of a display panel provided at the mobile phone shown in FIG. 1 when the operation shown in FIG. 5A is performed.

FIG. 5A illustrates the operation that inputs the character as described above, and FIG. 5B illustrates that the character input according to the operation shown in FIG. 5A is displayed on the display panel 4A. In FIG. 5A, the finger of the user is used as the operating body 17. The operating body 17 is not limited to the finger of the user in the present invention. For example, the operating body 17 may be an input pen provided with dielectric material at the tip end thereof.

In the input operation of the input device 5, for instance, as shown by a two-dot chain line in FIG. 5A, the operating body 17 which is the finger is placed to contact "2" of the operation key 11 formed on the operation unit 2. The user moves the finger (operating body 17) from "2" of the operation key 11 sequentially to "3"→"5"→"7"→"8", and then stops the finger (operating body 17) with the finger contacting "8" of the operation key 11.

In the case where the operating body 17 is moved to draw the character on the operation unit 2 (the coordinate input unit 20), when the control unit recognizes that the character input on the coordinate input unit 20 represents "Z" according to the movement locus of the operating body 17 which is the finger, the control unit instructs the display panel 4A to display "Z" as a locus display 19.

In this way, when the operating body 17 is moved to draw the character on the operation unit 2, the input device 5 allows the character corresponding to the movement locus of the operating body 17 to be displayed as the locus display 19 on the display panel 4A.

After the locus display 19 is displayed on the display panel 4A, when the character inputting is completed, the input character is confirmed according to the following operation for confirmation. Particularly, as shown in FIG. 5A, the input device 5 confirms the operation by tapping the operation unit 2 by using an operating body 18 different from the operating body 17 which performed the character inputting.

As shown by an arrow in the drawing, the operating body 18 taps the operation unit 2 with the operating body 17 which input the character kept in contact with "8" of the operation key 11, where the operating body 17 is in contact when the character inputting is completed.

As shown in FIG. 5A, for instance, when the operating body 17 is the finger of the user, the operating body 18 may be a finger which is different from the finger for the operating body 17. In the case where the operating body 18 employs the finger different from that for the operating body 17, for instance, the operating body 17 for inputting the character may be the right index finger. After the character is input with the right index finger, this index finger is kept in contact with "8" of the operation key 11, and then the operation unit 2 is tapped using a finger different from this index finger, for instance, using the right middle finger, so that the input character can be confirmed.

When the operation unit 2 is tapped after the character is input, the driver 58 outputs an operation confirmation processing signal. Since the operation confirmation processing signal is an operation signal (false signal) similar to that generated by clicking a mouse, or by double tapping the operation unit 2, the operation of the character inputting can be confirmed.

Figure 6:
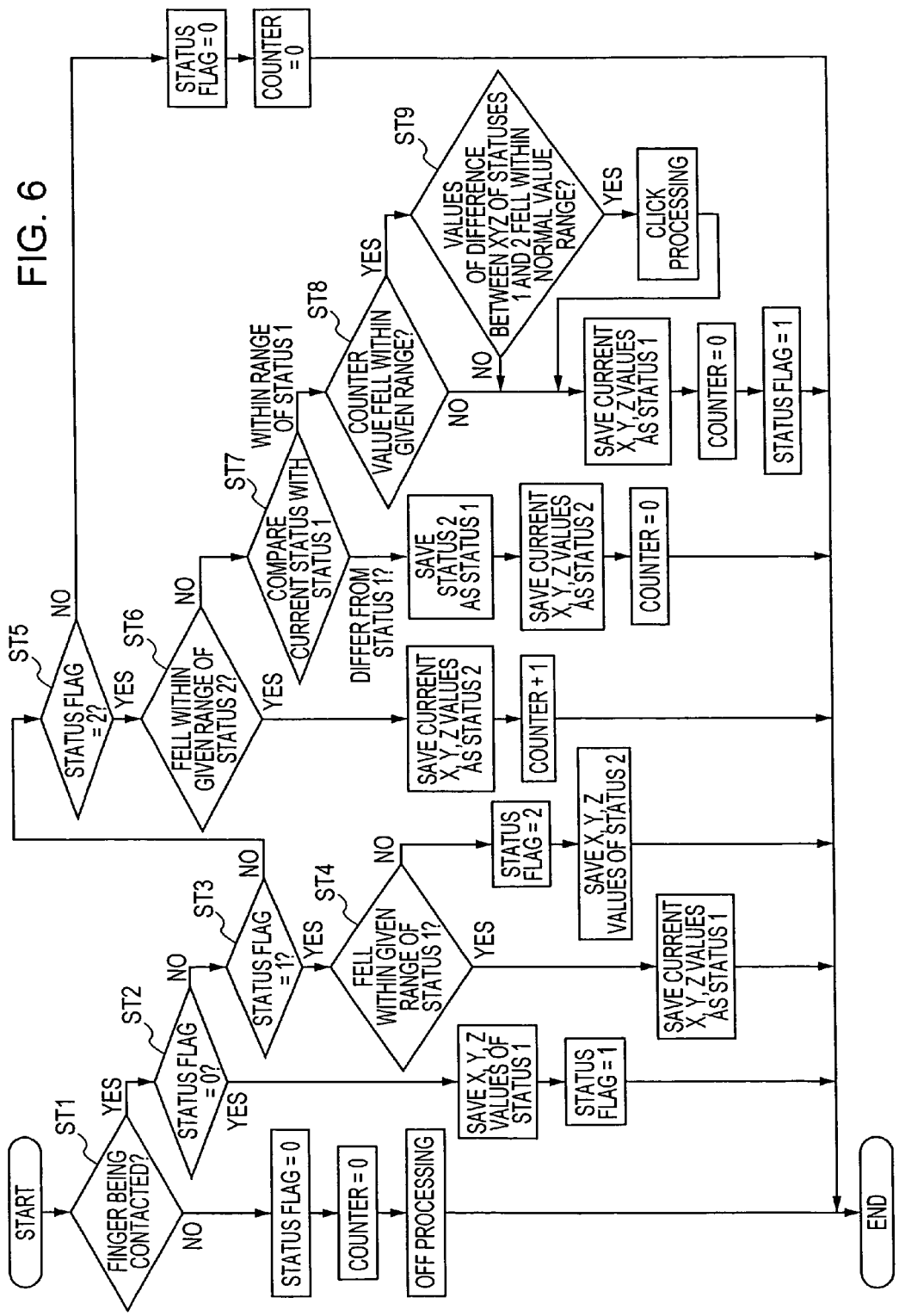
FIG. 6 is a flowchart showing a processing for inputting a character of the input device shown in FIG. 1.

FIG. 6 is a flowchart showing the processing for inputting the character on the operation unit 2 of the input device 5 by writing the character with the operating body 17. Note that this flowchart shown in FIG. 6 illustrates the case where the finger of the user is used as the operating body 17. Therefore, in the description related to FIG. 6, the word "finger" represents the operating body 17.

As shown in FIG. 6, the above-described processing for inputting the character determines whether the finger for the operating body 17 is in contact with the operation unit 2 (ST1).

In ST1, when it is determined that the finger does not contact the operation unit 2, as shown with "No", it is determined that a status flag is 0, a counter is 0, and a character-recognizing processing is "OFF". In the "OFF" status, the character recognition would not be performed by using the coordinate input unit 20. The "status flag" represents the processing status in the driver 58. The status flag is used for specifying the processing performed by the driver 58, by determining that the status is ST1, layer-described ST2, or the like. The "counter" represents whether the finger is in contact with the operation unit 2. It is determined that the counter is "0" when the finger does not contact the operation unit 2, while the counter is "1" in contacting.

Alternatively, in ST1, when it is determined that the finger is in contact with the operation unit 2, as shown with "Yes", it is determined whether the status flag is 0 (ST2).

When it is determined that the status flag is 0 in ST2, as shown with "Yes", the XY coordinate position of the finger is detected and saved. A contact area of the finger is also detected and saved. The contact area of the finger is represented by Z, and then saved together with the XY coordinate of the finger. At this time, the position status of the finger is saved as status flag 1. In addition, the position status of the finger is determined as status 1.

When it is determined that the status flag is not 0 in ST2, as shown with "No", it is determined whether the status flag is 1 (ST3).

In ST3, when it is determined that the status flag is 1, as shown with "Yes", it is determined whether the position of the finger falls within a range of the status 1 (ST4).

In ST4, when it is determined whether the position of the finger falls within the range of the status 1, as shown with "Yes", the position status of the XYZ coordinate position of the finger is saved as the status 1.

Alternatively, in ST4, when the position of the finger does not fall within a given range, as shown with "No", the position status of the finger is determined as status 2, and the XYZ coordinate position of the finger is saved as status flag 2.

When it is determined that the status flag is not 1 in ST3, as shown with "No", it is determined whether the status flag is 2 (ST5).

In ST5, when it is determined that the status flag is 2, as shown with "Yes", it is determined whether the position of the finger falls within a range of the status 2 (ST6).

In ST6, when it is determined that the position of the finger falls within the range of the status 2, as shown with "Yes", the XYZ coordinate of the finger at this time is saved as the status 2. The counter is incremented only by 1, so that the counter is set to 1.

In ST6, when the position of the finger does not fall within the range of the status 2, as shown with "No", a current position status of the finger is compared with the status 1 (ST7).

In ST7, when it is determined that the current status of the finger differs from the status 1, the status 2 is saved as the status 1. The counter is set to 0.

When it is determined that the current status falls within the range of the status 1 in ST7, it is determined whether the XY coordinate of the finger is changed within a predetermined period of time. The above determination is whether the value of the counter falls within a given range by dividing the predetermined period of time by predetermined intervals to obtain one counter, and by considering whether the XY coordinate of the finger is changed within the range (given range) of the preset number of the counters (counter values), for example, within the predetermined period of time (ST8).

In ST8, when it is determined that the counter value does not fall within the given range, as shown with "No", the XYZ coordinate which represents the position coordinate of the finger is saved as the status 1, and the counter is set to 0. The position status of the finger is determined as the status 1, and the status flag is set to 1.

In ST8, when it is determined that the counter value falls within the given range, as shown with "Yes", it is determined whether the difference between the XYZ coordinate position of the status 1 and that of the status 2 falls within a normal range (ST9). The normal range can be arbitrary set.

In ST9, when the difference between the XYZ coordinate of the status 1 and that of the status 2 does not fall within the normal range, as shown with "No", the XYZ coordinate which is the position coordinate of the finger at this time is saved as the status 1, and the counter is set to 0. In addition, the position status of the finger is determined as the status 1, and the status flag is set to 1.

In ST9, when the difference between the XYZ coordinate of the status 1 and that of the status 2 falls within the normal range, as shown with "Yes", if the operation unit 2 is tapped with the finger, the driver 58 provides the operation signal (false signal) similar to that to be generated by clicking a mouse, or by double tapping the operation unit 2. The XYZ coordinate, which is the position coordinate of the finger at this time is saved as the status 1, and simultaneously, the counter is set to 0. In addition, the position status of the finger is determined as the status 1.

In ST5, when it is determined that the status flag is not 2, as shown with "No", the status flag is set to 0, and also the counter is set to 0.

After the input operation is performed and while the operating body 17 is contacting the operation unit 2, the tapping is performed on the operation unit 2, with the operating body 17 kept in contact with the operation unit 2. At the time of tapping, the driver 58 that is the data processing unit outputs the confirmation processing signal for the input operation, whereby the input operation is confirmed.

With the input device 5, merely the tapping can effect the input confirmation without releasing the operating body 17 which performed the input operation from the operation unit 2, thereby simplifying the operation.

Since the input confirmation can be performed without releasing the operating body 17, which performs the input operation from the operation unit 2, problems like deformation of the form of the character which input with the operating body 17 due to the releasing of the operating body 17 from the operation unit 2 for the input confirmation, can be prevented.

The operation for the input confirmation according to the input device 5 does not require waiting for the predetermined period of time to pass as compared with the conventional input device in which the input confirmation is performed if any input operation is not performed for the predetermined period of time after the input operation is completed, thereby markedly decreasing the time required for the input operation.

The character to be written in the operation unit 2 is not limited to "Z", for example, other arbitrary character can be written. In such a case, a character corresponding to the arbitrary character written in the operation unit 2 would be displayed on the display panel 4A as the locus display 19. The object to be written in the operation unit 2 is not limited to the character, and any object like a symbol or a figure can be written. In such a case, a symbol or figure corresponding to the arbitrary symbol or figure written in the operation unit 2 would be displayed on the display panel 4A as the locus display 19.

The input device 5 can display a selectable menu or enable an operation processing to be performed with a movable cursor, when the operating body 17 such as the finger is moved on the operation unit 2 (coordinate input unit 20).

The input device 5 may be configured to enable a selection from a popup menu or the like displayed on the display panel 4A. For example, when a homepage (webpage) window of the Internet is displayed on the display panel 4A, the cursor displayed on the display panel 4A is moved according to the input operation (movement of the operating body 17) for the operation unit 2 (coordinate input unit 20), and if the position to select the menu is determined by moving the cursor, an operation for confirming the menu is then performed. The operation confirmation may be performed by tapping the operation unit 2 with the operating body 17 such as the finger.

In FIGS. 1 to 5, while the input device 5 is mounted on the mobile phone 1 as an example, the input device 5 may be mounted on an apparatus other than the mobile phone 1, for example, on a personal computer.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

What is claimed is:

1. An input device comprising:
    an operation unit;
    a coordinate input unit capable of detecting that an operating body is in contact with the operation unit and detecting a position coordinate on the operation unit of a position where the operating body contacted the operation unit; and
    a data processing unit that outputs an operation processing signal on the basis of a detection signal received from the coordinate input unit,
    wherein the data processing unit outputs an operation confirmation processing signal for the input operation after an input operation is performed while the operating body is contacting the operation unit, when tapping is performed on the operation unit, and
    wherein the operating body is in contact with the operation unit.

2. The input device according to claim 1, wherein the operation confirmation processing signal is output when the tapping is performed by another operating body which is different from the operating body that performs the input operation.

3. The input device according to claim 1, wherein the operation confirmation processing signal is an operation processing signal similar to that output when double tapping is performed on the operation unit.

4. The input device according to claim 1, wherein the coordinate input unit includes a plurality of X-direction electrodes provided on one surface of a base material sheet; a plurality of Y-direction electrodes provided on the other surface; and a plurality of common electrodes provided on either the one surface or the other surface that provide predetermined capacitances between the common electrodes and the X-direction electrodes, and between the common electrodes and the Y-direction electrodes.

5. The input device according to claim 4, wherein the operating body is a dielectric.

6. The input device according to claim 5, wherein the operating body is a finger.

7. A method for confirming an input operation including:
    placing a first operation body in contact with a input device;
    inputting a character on the input device with the first input device; and
    tapping the input device with a second operation device while the first operation body is in contact with the input device.

8. The method according to claim 7, wherein inputting a character includes tracing the character on the input device.

* * * * *

UNITED STATES PATENT AND TRADEMARK OFFICE
CERTIFICATE OF CORRECTION

PATENT NO.       : 7,656,314 B2                                   Page 1 of 1
APPLICATION NO.  : 11/511942
DATED            : February 2, 2010
INVENTOR(S)      : Muranaka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 817 days.

Signed and Sealed this

Thirtieth Day of November, 2010

David J. Kappos
*Director of the United States Patent and Trademark Office*